(12) United States Patent
Shen et al.

(10) Patent No.: US 8,117,420 B2
(45) Date of Patent: Feb. 14, 2012

(54) BUFFER MANAGEMENT STRUCTURE WITH SELECTIVE FLUSH

(75) Inventors: Jian Shen, Austin, TX (US); Robert Allan Lester, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 12/187,986

(22) Filed: Aug. 7, 2008

(65) Prior Publication Data

US 2010/0037028 A1 Feb. 11, 2010

(51) Int. Cl.
*G06F 12/00* (2006.01)

(52) U.S. Cl. ........ 711/206; 711/100; 711/122; 711/128; 711/130; 711/200; 711/202; 711/207; 711/208

(58) Field of Classification Search .................. 711/122, 711/130, 138, 145, 207, 200, 202–205
See application file for complete search history.

(56) References Cited

U.S. PATENT DOCUMENTS

| 6,615,300 | B1 * | 9/2003 | Banning et al. | 710/100 |
| 7,707,320 | B2 * | 4/2010 | Singhai et al. | 709/250 |
| 2002/0062434 | A1 * | 5/2002 | Chauvel et al. | 711/207 |
| 2005/0055406 | A1 | 3/2005 | Singhai | |

FOREIGN PATENT DOCUMENTS

| EP | 1182570 | | 2/2002 |
| EP | 1182570 A2 | * | 2/2002 |
| WO | 0135233 | | 5/2001 |

OTHER PUBLICATIONS

International Search Report—PCT/US2009/051705, International Search Authority—European Patent Office Jan. 21, 2010.
Written Opinion—PCT/ US2009/051705, International Search Authority—European Patent Office Jan. 21, 2010.

* cited by examiner

*Primary Examiner* — Tuan Thai
*Assistant Examiner* — Zhou Li
(74) *Attorney, Agent, or Firm* — Peter M. Kamarchik; Nicholas J. Pauley; Jonathan T. Velasco

(57) ABSTRACT

A buffer management structure for processing systems is described. In one embodiment, the buffer management structure includes a storage module and a control module. The storage module includes a read position and can store a bit indicating a valid state of a transaction request in a write entry. The control module can receive an invalidation request and modify the bit to indicate an invalid state for the transaction request and discard the transaction request when the transaction request is in the read position.

31 Claims, 15 Drawing Sheets

BUFFER MANAGEMENT STRUCTURE WITH SELECTIVE FLUSH

FIELD OF THE DISCLOSURE

Embodiments of the inventive concepts disclosed herein relate generally to the field of data processing systems. More particularly, embodiments of the inventive concepts disclosed herein relate to buffer management structures for use in multi-threaded processors.

BACKGROUND

Data processing systems can include various components that interact with each other to process an instruction. In a multi-threaded processor, for example, processor threads may send transaction requests to a resource that is a processor component, such as a memory management unit. The transaction requests may be a request for data, instruction, address, or other information for processing. The transaction requests may be sent during the same clock cycle or in successive clock cycles, while the processor component may be capable of responding to one transaction request in a clock cycle. Furthermore, some transaction requests may be cancelled at a later clock cycle. Data processing systems may include a transaction request management process to manage the incoming transaction requests at the same or different clock cycles and invalidated transaction requests.

One transaction request management process is round robin. In a round robin process, a management component marks the thread from which the last transaction request was provided to the resource and begins checking the next thread after the mark for a transaction request. The management component may continue in order of threads thereafter until it finds a next transaction request. The round robin process, however, can introduce delays in processing if the transaction requests are not provided in sequentially ordered threads or if a transaction request is subsequently invalidated.

Another transaction request management process is using a link list. A link list may be a storage component in which a transaction request is linked to the previous and next transaction requests respectively. After a transaction request is sent to the resource or invalidated, the process identifies the next transaction request linked to the sent or invalidated transaction request. The link list can be useful for managing several transaction requests, but can require power resources and clock cycles to reconfigure the links upon invalidation of a transaction request.

Accordingly, a transaction request management system and process is desirable to decrease latency due to pending or invalid transaction requests and/or decrease power necessary to perform transaction request management.

SUMMARY OF THE DISCLOSURE

In an embodiment, a buffer management structure is described. The buffer management structure includes a storage module and a control module. The storage module can store a bit indicating a valid state of a transaction request to a write entry. The storage module can include a read position. The control module can receive an invalidation request and modify the bit to indicate an invalid state for the transaction request and discard the transaction request when the transaction request is at the read position.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Figure 1:
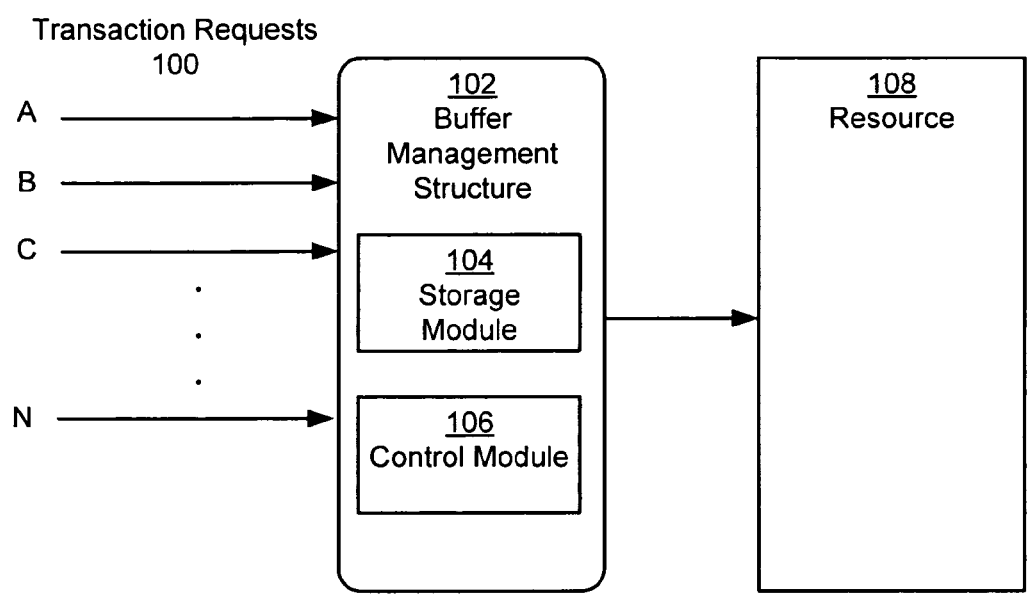
FIG. 1 is a general diagram illustrating an example of a buffer management structure managing transaction requests to a resource.

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to a buffer management structure capable of managing transaction requests from threads of a multi-threaded processor and selectively flushing invalid transaction requests. "Flushing" as used herein means to identify a transaction request upon receiving an invalidation request for the transaction request and discarding the invalid transaction request when it is at a read position. The read position may be a fixed read position or a location of a movable read pointer associated with the buffer management structure.

In multi-threaded architecture, each thread of a processor may be capable of providing a transaction request to a resource at the same or different time. Each thread may also be capable of providing an invalidation request for a transaction request. For example, a thread can provide a transaction request and subsequently provide an invalidation request for the transaction request, requesting that the transaction request be cancelled. Examples of reasons the thread provides an invalidation request include the subject of the transaction request is no longer needed or the subject was obtained from a different resource. The transaction requests may be any type of request for data, instructions, addresses, or other information from resources. An example of a resource is a memory management unit (MMU) such as a translation lookaside buffer that can store a virtual address of an instruction or data and an associated physical address. For example, a transaction request may include a request for the physical address of an instruction based on the instruction's virtual address.

Buffer management structures according to some embodiments may allow the transaction requests to be provided to the resource in the order in which they are provided from their respective thread. Certain buffer management structures may also manage the transaction requests if an invalidation request is received for one or more of the transaction requests. The buffer management structure can include a storage module for storing the transaction requests with a validity indicator and control logic for controlling the storage module. In some embodiments, the buffer management structure is a First In First Out (FIFO) queue that stores each transaction request in a write entry that are ordered based on when the transaction requests are received. One write entry may be located at a fixed read position from which transaction requests are provided out of the FIFO. In other embodiments, the FIFO includes a moveable read pointer that identifies the entry to be read out.

The validity indicator may be a bit that indicates whether the transaction request is in a valid state or invalid state. A transaction request may be in an invalid state if an invalidation request is received for the transaction request. For example, when an invalidation request is received for a transaction request, control logic associated with the buffer management structure can change the bit associated with the transaction request to indicate an invalid state for the transaction request. When the invalid transaction request is at a write entry located at the read position, it can be automatically read out of the buffer management structure and automatically discarded. When a valid transaction request is in the write entry located at the read position, it can be read out to the resource, such as upon receiving a read request from the resource. By maintaining the order in which transaction requests are received, identifying invalid transaction requests, and automatically reading out and discarding invalid transaction requests, some embodiments of buffer management structures can manage transaction requests to decrease or minimize latency and/or reduce power needed for processing.

Buffer management structures according to some embodiments can be implemented between processor threads providing transaction requests and one or more resources to which the threads are providing the transaction requests. FIG. 1 shows a block diagram of an implementation of one embodiment of a buffer management structure. Transaction requests 100A-N for a resource 108 can be received by a buffer management structure 102 for management. Each of the transaction requests 100A-N may be provided by a processor thread. For example, processor thread A (not shown) can provide transaction request 100A and processor thread B (not shown) can provide transaction request B. Each processor thread can also provide an invalidation request to the buffer management structure 102. The invalidation request can include an instruction representing an exception that identifies a previously provided transaction request to invalidate.

The buffer management structure 102 can include a storage module 104 and a control module 106. The storage module 104 can store the transaction requests 100A-N in the order they are received such that the first transaction request received may be the first transaction request provided to the resource 108. A validity indicator, such as a bit, can be associated with each transaction request and stored in the storage module 104. In some embodiments, the control module 106 can receive an invalidation request from a thread for a transaction request stored in the storage module 104 and modify the validity indicator to indicate the transaction request is invalid. When the invalid transaction request is the next transaction request to be provided by the buffer management structure 102, it may be automatically discarded.

Figure 2A:
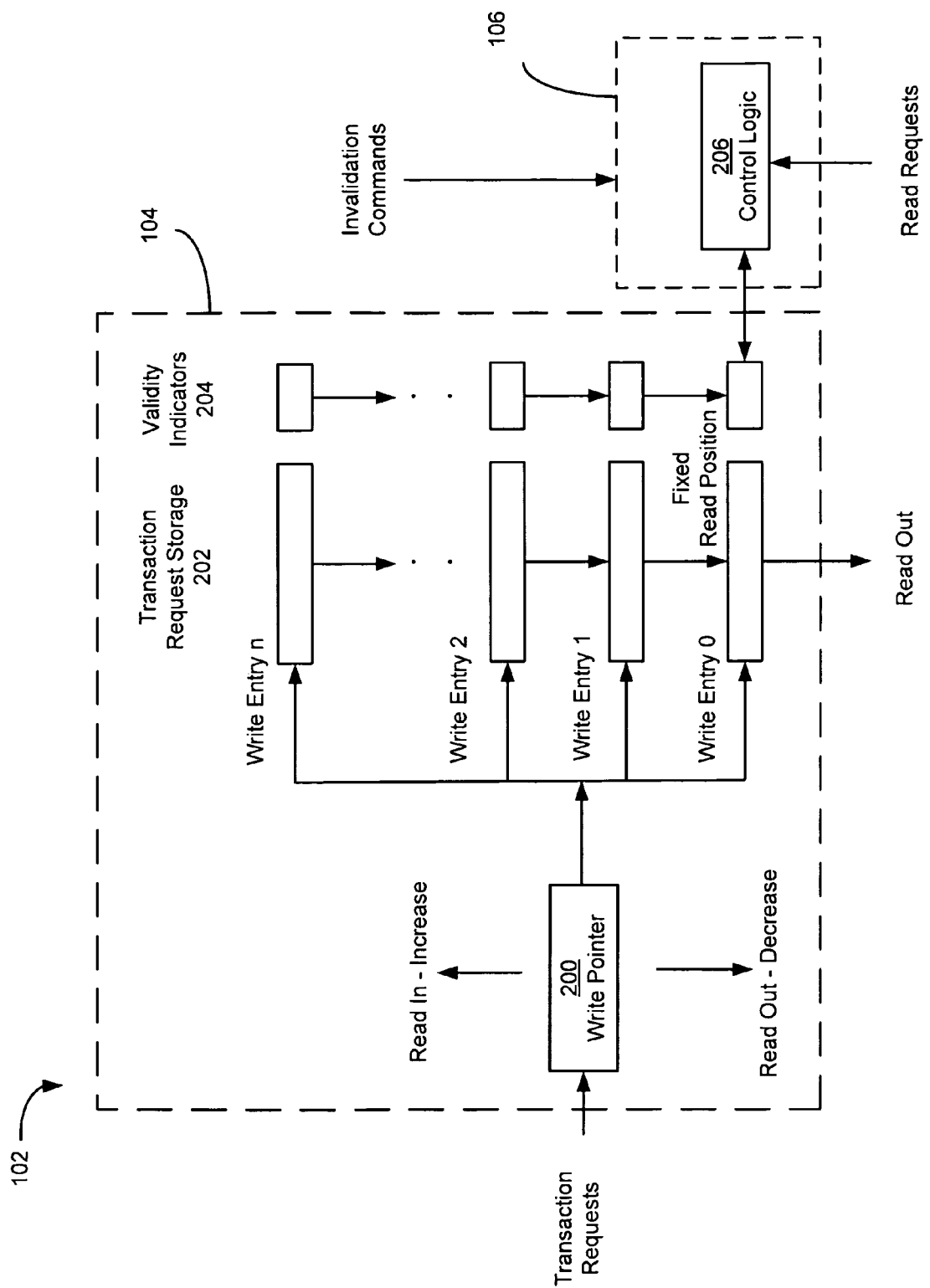
FIG. 2A is a general diagram illustrating an embodiment of the buffer management structure of FIG. 1.
Figure 2B:
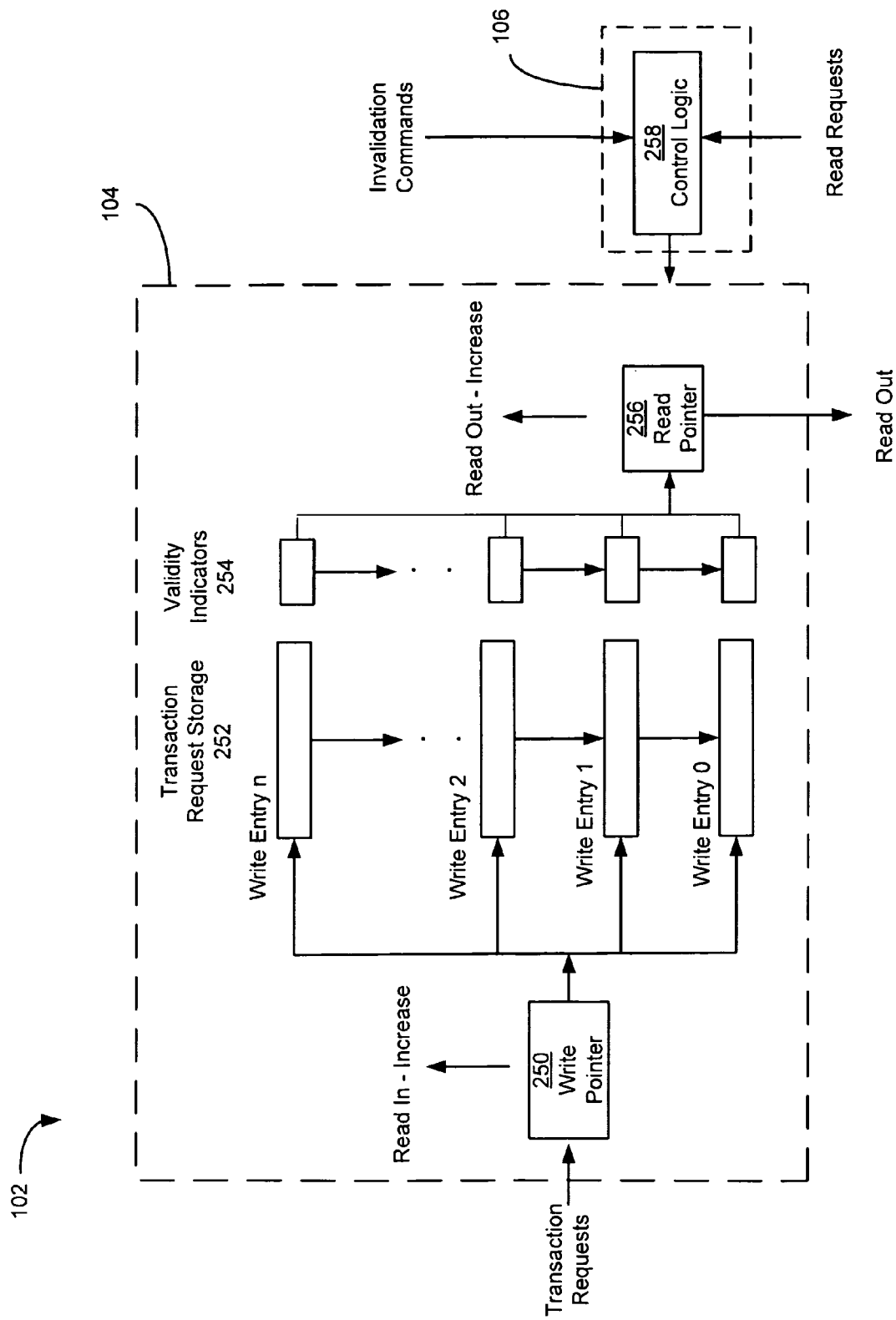
FIG. 2B is a general diagram illustrating a second embodiment of the buffer management structure of FIG. 1.

Buffer management structures according to various embodiments can be, or include, any storage and management components that are capable of storing transaction requests in order and identifying invalid transaction requests. For example, and as illustrated in FIGS. 2A-2B, some embodiments of buffer management structure 102 of FIG. 1 can include a storage module 104 that is a FIFO coupled to a control module 106. FIG. 2A illustrates a FIFO that includes a moveable write pointer and a fixed read position. FIG. 2B illustrates a FIFO that includes a moveable write pointer and a moveable read pointer.

The FIFO in FIG. 2A can include a write pointer 200 and write entries 0-n that include transaction request storage 202, and validity indicators 204. The write entries 0-n may be ordered with each write entry adjacent to at least one other write entry. The storage module 104 can include any number of write entries 0-n. In one embodiment, the storage module 104 includes twelve write entries. Each write entry can store a transaction request and a validity indicator associated with the transaction request. In some embodiments, each transaction request storage is a three bit register associated with a validity indicator that is a bit indicating whether the transaction request is in a valid state or an invalid state. A bit that is digital "1" can indicate a transaction request in a valid state and a bit that is digital "0" can indicate a transaction request in an invalid state.

The storage module 104 can be configured to move transaction requests and associated validity indicators from one write entry to another. For example, if the transaction request at write entry 0 is read out of the storage module 104, a transaction request and its validity indicator in write entry 1 may be moved to write entry 0. Reading out a transaction request can include popping, discarding, or providing the transaction request from the storage module 104.

The write pointer 200 identifies the write entry to which a received transaction request is read in or stored. The write pointer 200 can increase an entry when a transaction request is read in to storage module 104 and decrease an entry when a transaction request is read out of transaction request storage 202. For example, the write pointer 200 may be initially identifying write entry 0 to store a transaction request as a default position. Write entry 0 may be located at a fixed read position that identifies the next transaction request to be read out of the storage module 104. After a first received transaction request is pushed into write entry 0 and stored, the write pointer 200 increases to write entry 1 as the next write entry in which to store a subsequently received transaction request. If the first received transaction request is read out of the storage module 104, the write pointer 200 decreases a write entry, for example to write entry 0.

The control module 106 includes control logic 206 that can receive invalidation requests to invalidate a transaction request. After receiving an invalidation request, the control logic 206 can identify the transaction request to invalidate based on the invalidation request and change a validity indicator associated with the identified transaction request to indicate an invalid state.

The control logic may also be configured to determine when a transaction request at write entry 0 is to be read out of the storage module 104. If the transaction request in entry 0 is associated with a validity indicator indicating an invalid state, the control logic 206 may cause the transaction request to be automatically read out from entry 0 and be discarded. For example, a resource that receives the invalid transaction request may ignore it and continue its operation. If the transaction request in write entry 0 is associated with a validity indicator that indicates the transaction request is in a valid state, the control logic 206 may cause the transaction request to be read out of entry 0 and provided to the resource after receiving a read request from the resource. In some embodiments, the read request is received by the storage module 104, instead of the control module 106, and the transaction request at write entry 0 is automatically read out. The read request can include an indication from the resource that it is ready or otherwise available to process or receive a transaction request.

In some embodiments, the buffer management structure 102 includes a FIFO having a moveable read pointer. FIG. 2B illustrates an embodiment of a FIFO that includes a write pointer 250, transaction request storage 252, validity indicators 254, and a read pointer 256. The write pointer 250 is movable when a transaction request is read into the FIFO. For example, the write pointer 250 can initially point to write entry 0 and, after a transaction request is read in and stored in the transaction request storage 252 of write entry 0, the write pointer 250 increases to write entry 1 as the next entry to write a transaction request upon receipt. When a transaction request is stored in write entry n, the write pointer 250 is configured to move to write entry 0 as the next entry to store a transaction request.

The read pointer 256 can identify the entry from which to read out upon the next read out. The read pointer 256 can be configured to move positions to identify an entry to be read out next. The read position corresponds to the entry associated with the read pointer 256 and can change depending upon the position of the read pointer 256. Instead of transaction requests moving entries as a transaction request is read out of the FIFO, the read pointer 256 is configured to increase a position each time a transaction request is read out of the FIFO. For example, the read pointer 256 may be initially associated with write entry 0 as the read position from which a transaction request is next read out of the FIFO. When the transaction request stored in write entry 0 is read out, the read pointer 256 increases to write entry 1 as the read position from which the a transaction request is next read out of the FIFO. When a transaction request stored in write entry n is read out, the read pointer 256 is configured to move to write entry 0 as the read position from which a transaction request is next read out of the FIFO.

In some embodiments, the write pointer 256 is configured to identify an invalid transaction request and discard it. For example, the write pointer 256 can determine that the indicator associated with a transaction request at the current read position indicates that the transaction request is in an invalid state and discard the invalid transaction request.

The read pointer 256 can receive commands or other instructions from control module 106 that includes control logic 258. For example, the control logic 258 can receive a read request from a resource. The read request can include an indication that the resource is ready to receive a transaction request. The read pointer 256 can receive a command from the control logic 258 to output a valid transaction request at the read position and cause the stored transaction request to be read out of the FIFO and provided to the resource.

As described above, FIFOs according to some embodiments can be implemented to manage the order in which transaction requests are provided to resources and coupled to control logic to identify invalid transaction requests. FIGS. 3-7 illustrate an exemplary FIFO managing transaction requests from threads in a multi-threaded processor architecture. The FIFO shown in FIGS. 3-7 includes five write entries (shown as 0-4) and a fixed read position. However, any number of entries and/or a FIFO with a read pointer that changes the read position can be used. The write entries in FIGS. 3-7 include transaction request storage 302 and validity indicators 304.

Figure 3:
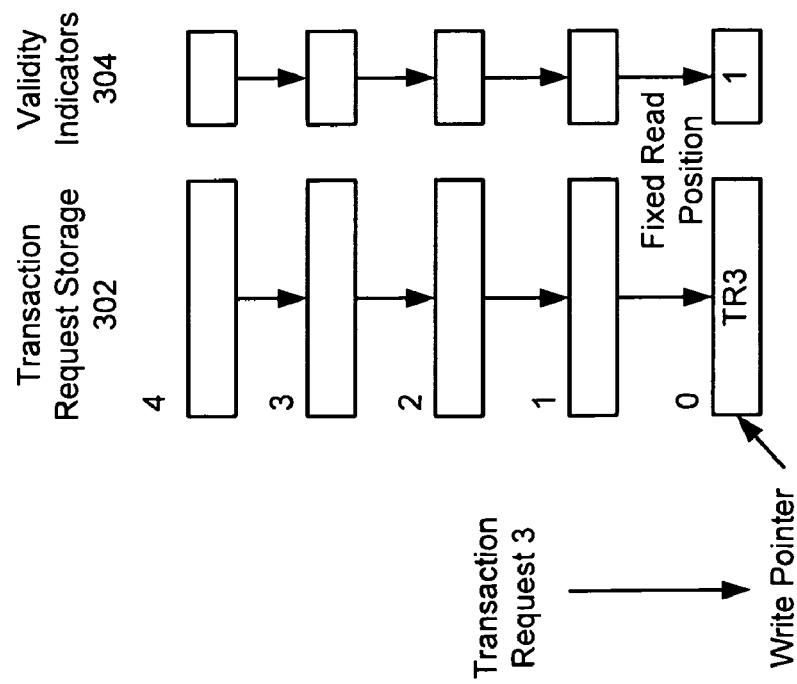
FIG. 3 is a general diagram of a first transaction request pushed into an exemplary buffer management structure.

FIFOs according to some embodiments can order transaction requests in storage based on when the FIFO receives the transaction requests instead of the order of the processor thread from which the transaction request is provided. For example, FIG. 3 shows a first transaction request (TR3) received by the FIFO from thread 3 (not shown). The write pointer is in a default position, associated with write entry 0, and pushes TR3 to write entry 0 for storage. A validity indicator, such as a bit of digital "1", is stored in the validity indicator of write entry 0 and associated TR3. In some embodiments, the bit includes a transaction identification that identifies the transaction request stored in write entry 0. Write entry 0 may be the FIFO's fixed read position such that the transaction request stored in entry 0 is read out first.

Figure 4:
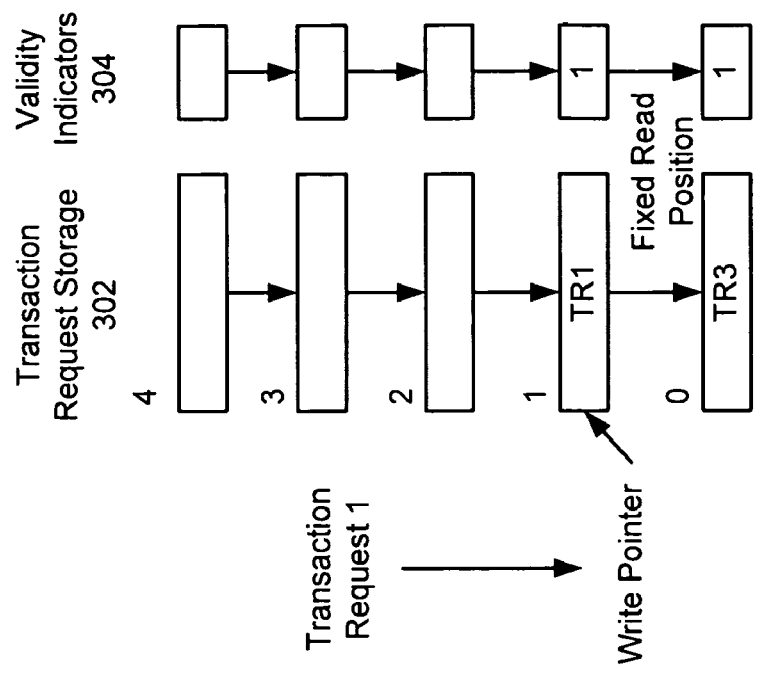
FIG. 4 is a general diagram of a second transaction request pushed into the exemplary buffer management structure of FIG. 3.

Referring to FIG. 4, the write pointer is incremented to write entry 1 since TR3 was pushed into the FIFO as was shown in FIG. 3. A second transaction request (TR1) is received from thread 1 (not shown) and pushed into write entry 1 for storage. A valid bit is associated with TR1 in the validity indicator of write entry 1. Since write entry 1 is not located at the fixed read position, TR3 may be read out of the FIFO before TR1.

Figure 5:
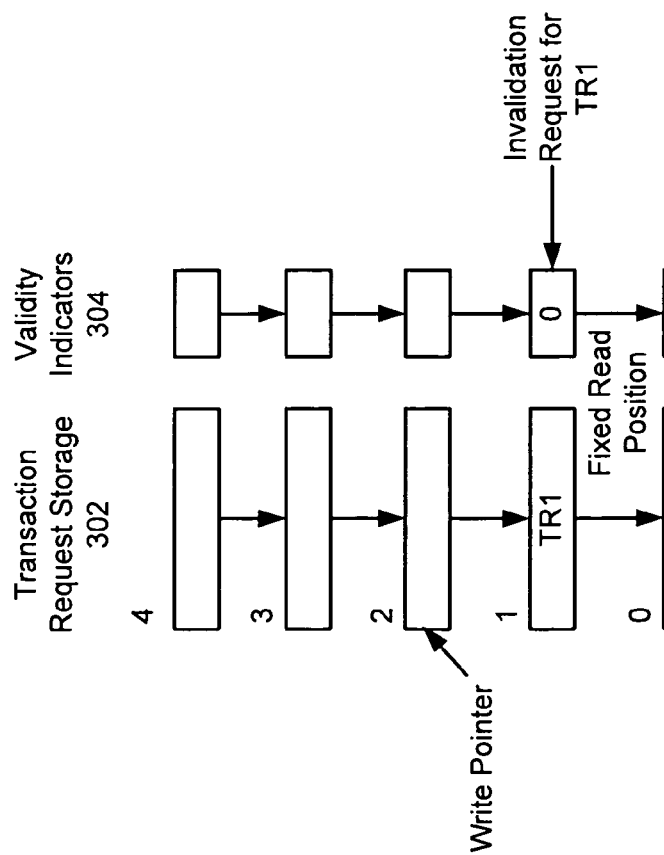
FIG. 5 is a general diagram of a selective flush based on an invalidation request for the second transaction request received by the buffer management structure of FIG. 3.

In FIG. 5, the write pointer is incremented to write entry 2 since TR1 was pushed into the FIFO as shown in FIG. 4. An invalidation request for TR1 is received from thread 1. In some embodiments, the invalidation request includes an identification of the transaction request and an instruction to invalidate the identified transaction request. A control module (not shown) can modify the bit associated with TR1 to indicate an invalid state, shown as digital "0".

Figure 6:
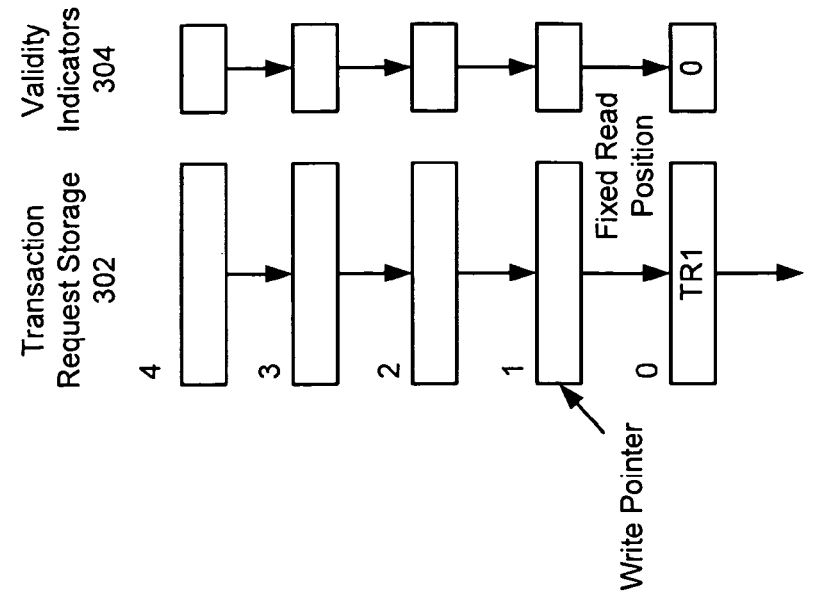
FIG. 6 is a general diagram of the second transaction request in a fixed read position after the first transaction request is provided from the buffer management structure of FIG. 3.
Figure 7:
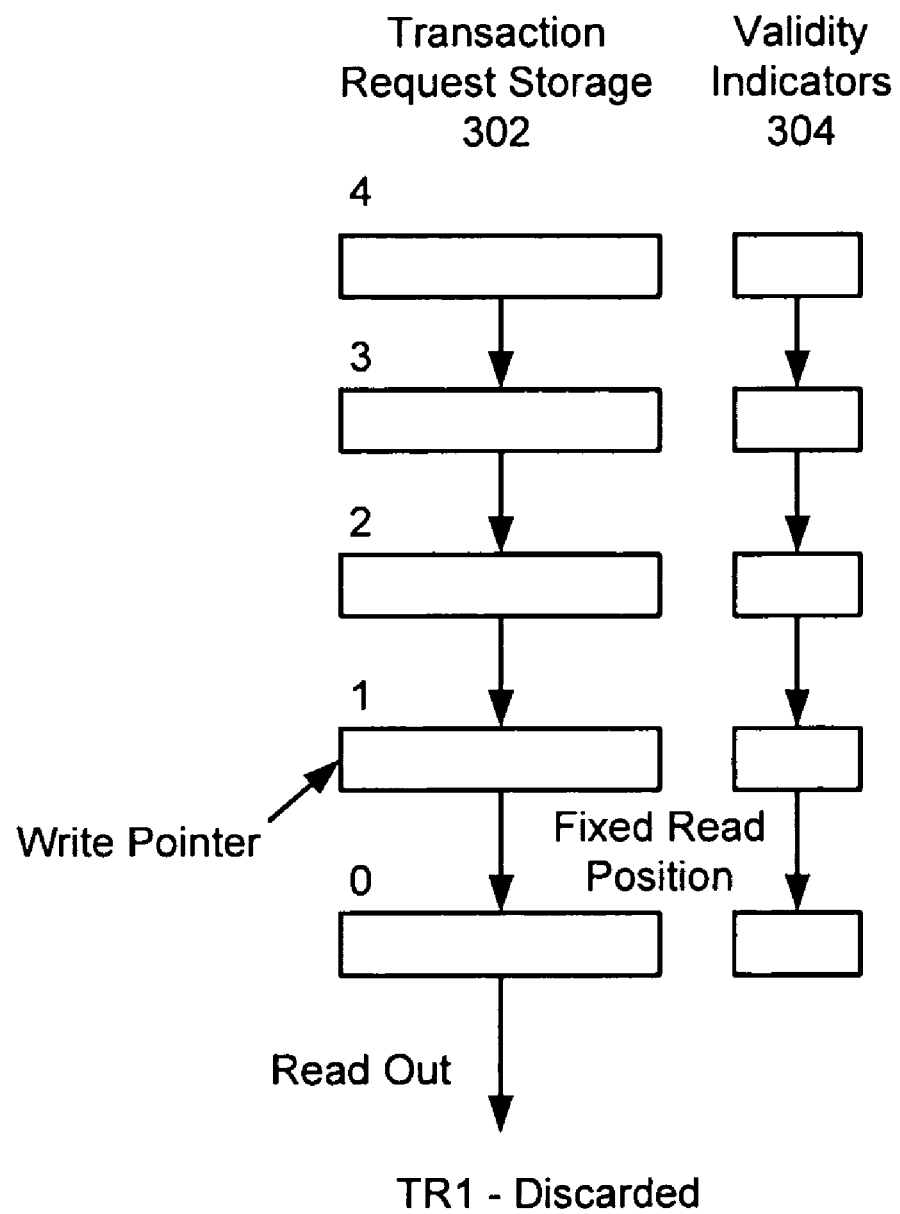
FIG. 7 is a general diagram of the second transaction request automatically discarded from the buffer management structure of FIG. 3.

In FIG. 6, a read request is received from a resource. For example, the resource may provide the FIFO with an instruction that it is available to process transaction requests. Since TR3 is in write entry 0 at the fixed read position and in a valid state, it is read out of the FIFO and provided to the resource. The write pointer is decreased to the entry 1 position since a transaction request is read out of the FIFO. In addition, TR1 is moved to the fixed read position, entry 0. In FIG. 7, TR1 is read out of the FIFO and discarded. In some embodiments, the control module monitors the validity indicator of the transaction request at the fixed read position. For example, the control module can determine that a transaction request in an invalid state is at the fixed read position and cause the transaction request to be read out of the FIFO where it is ignored by the resource. In addition, the write pointer is decreased to entry 0 since a transaction request was read out of the FIFO.

In some embodiments, a transaction request in an invalid state may be located at the read position at the same time that a read request is received from a resource. Control modules according to some embodiments can be configured to discard invalid transaction requests at the read position by monitoring the validity indicator of the transaction request at the read position, determining the transaction request is invalid based on the indicator and reading out the transaction request from the buffer management structure. An invalid transaction request may be ignored by resources after it is read out of the buffer management structure.

Figure 8A:
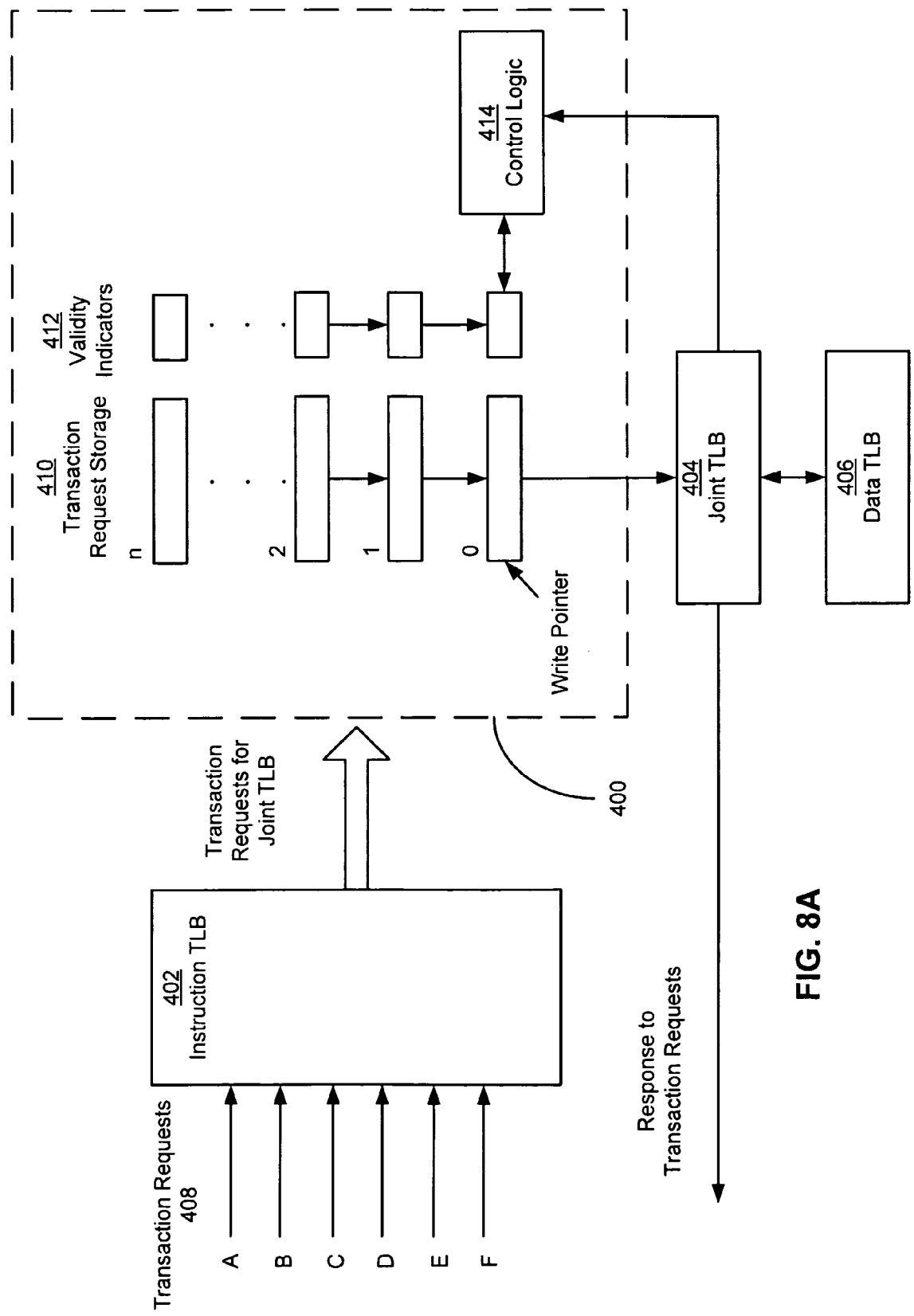
FIG. 8A is a general diagram of an exemplary implementation of the buffer management structure of FIG. 2 with resources that include translation lookaside buffers.

Buffer management structures according to some embodiments can be implemented between two resources to which threads of a multi-threaded processor are providing transaction requests. FIG. 8A illustrates an example of one implementation of a buffer management structure 400 and memory management units (MMUs) that include an instruction translation lookaside buffer (TLB) 402, a joint TLB 404, and a data TLB 406. In some embodiments, TLBs can include a list of virtual addresses of instructions or data where each virtual address is associated with a physical address of the instruction or data. The MMUs can be in communication with threads that provide transaction requests 408 including a virtual address of the instruction requested. The MMUs can return a physical address that corresponds to the virtual address in response to the transaction request.

In some multi-threaded processors, multiple MMUs such as TLBs are utilized to improve performance and decrease latency. For example, the instruction TLB 402 may be a smaller sized MMU than the joint TLB 404 and can include a smaller number of instructions that may be commonly provided to threads. A thread may provide a transaction request to the instruction TLB 402 for an instruction and, if the requested instruction is not located in the instruction TLB 402, the transaction request is provided to the joint TLB 404 that includes a larger number of instructions, including those less commonly accessed by threads.

The joint TLB 404 may include both instructions and data and can be configured to service requests from both the instruction TLB 402 and a data TLB 406. In some embodiments, the requests provided to the joint TLB 404 from the data TLB 406 have a higher priority than the requests provided from the instruction TLB 402. If a request from the instruction TLB 402 is provided to the joint TLB 404 when the joint TLB 404 is processing a request from the data TLB 406, a collision between the request from the instruction TLB 402 and the request from the data TLB 406 can occur. When a collision occurs, the joint TLB 404 may not process the request from the instruction TLB 402 until after it has finished processing the request from the data TLB 406. A back-log of requests from the instruction TLB 402 can occur, delaying processing by threads.

The buffer management structure 400 can manage the transaction requests from the instruction TLB 402 during a back-log and may decrease latency caused by the back-log or invalid transaction requests. For example, the instruction TLB 402 can receive transaction requests 408 from processor threads A-F. If address information for the instructions identified in the transaction requests are not found in the instruction TLB 402, the instruction TLB 402 provides the transaction requests for the joint TLB 404 to the buffer management structure 400.

The buffer management structure 400 may contain a FIFO that includes write entries (0-n). The write entries can include transaction request storage 410 and validity indicators 412. A transaction request stored in a write entry can be associated with a bit in the validity indicators 412 that indicates a valid or invalid state of the transaction request. In some embodiments, the transaction requests are initially associated with a bit indicating a valid state. As described above, a processor thread may provide an invalidation request for a transaction request and the bit can be modified to indicate an invalid state. In some embodiments, the invalidation requests are provided to the instruction TLB 402 and, if the instruction TLB 402 has provided the transaction request that is the subject of the invalidation request to the buffer management structure 400, the instruction TLB 402 can provide the invalidation request to the buffer management structure 400. The buffer management structure 400 can include control logic 414 that uses the invalidation request to identify the transaction request and change the bit to indicate an invalid state for the identified transaction request. If a transaction request associated with an invalid bit is in entry 0, the fixed read position in the embodiment shown, the control logic 414 can cause the FIFO to automatically read out the invalid transaction request in, for example, the next clock cycle. The joint TLB 404 can ignore the invalid transaction request and it is discarded. In some embodiments, the buffer management structure 400 includes a movable read position instead of the fixed read position. The movable read position can be identified by a read pointer that is configured to change position when a transaction request is read out of the FIFO. Instead of moving entries on a read out, the transaction requests may be stored in the same write entry until they are provided from the FIFO.

When the joint TLB 404 is ready to process a transaction request from the instruction TLB 402, it may provide a read request to the buffer management structure 400. The read request may be received by the control logic 414. Upon receipt of the read request, the control logic 414 may read out a valid transaction request that is in the fixed read position out of the FIFO and provide it to the joint TLB 404. The joint TLB 404 can process the transaction request and provide a response to the thread that provided the transaction request. An example of a response is a physical address of an instruction that is the subject of the transaction request.

Figure 8B:
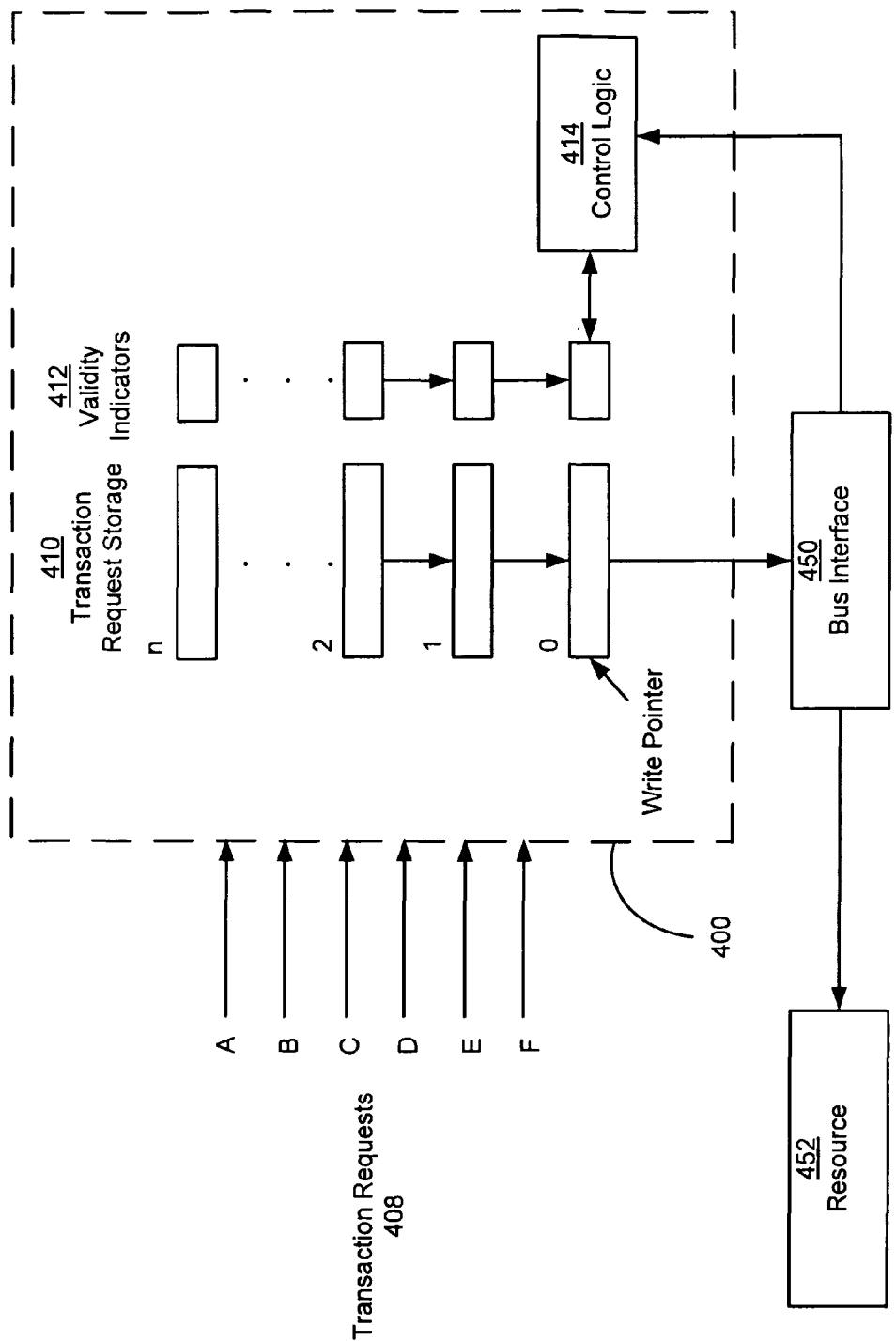
FIG. 8B is a general diagram of a second exemplary implementation of the buffer management structure of FIG. 2 with a bus interface.

In some embodiments, the buffer management structure 400 may be implemented with system components other than the instruction TLB 402, joint TLB 404, and data TLB 406. FIG. 8B illustrates an example of an implementation of the buffer management structure 400 for buffering transaction requests 408 to be routed via a bus interface 450 to a resource 452. An example of bus interface 450 is an AXI bus interface.

The bus interface 450 can be used to carry transaction requests 408 for accessing the resource 452. If the bus interface 450 is carrying a first transaction request for accessing the resource 452, a second transaction request may be stored in the buffer management structure 400 until the bus interface 450 is free to carry the second transaction request. In some embodiments, the bus interface 450 provides a read request to the control logic 414 when it is ready to carry a transaction request from the buffer management structure 400. The control logic 414 can cause the FIFO to read out a transaction request at the fixed read position. In other embodiments, the control logic 414 can determine that the bus interface 450 is available and causes the FIFO to read out a transaction request at the fixed read position.

The control logic 414 can determine that the transaction request at the fixed read position is invalid based on the validity indicator and cause the FIFO to automatically read out the invalid transaction request in, for example, the next clock cycle. The bus interface 450 can ignore the invalid transaction request and it is discarded.

Figure 9:
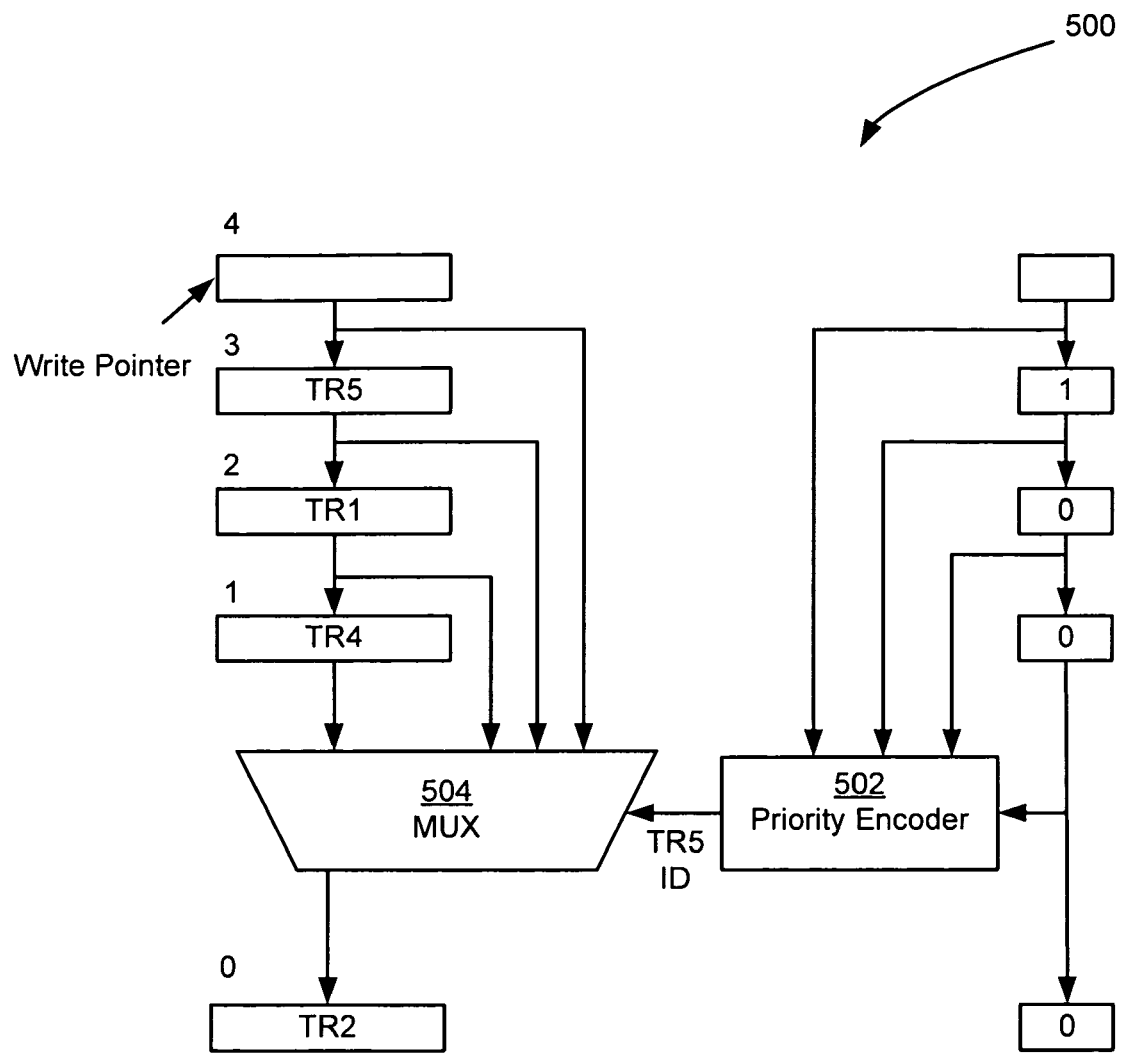
FIG. 9 is a general diagram of a second exemplary buffer management structure for determining a next valid transaction request.
Figure 10:
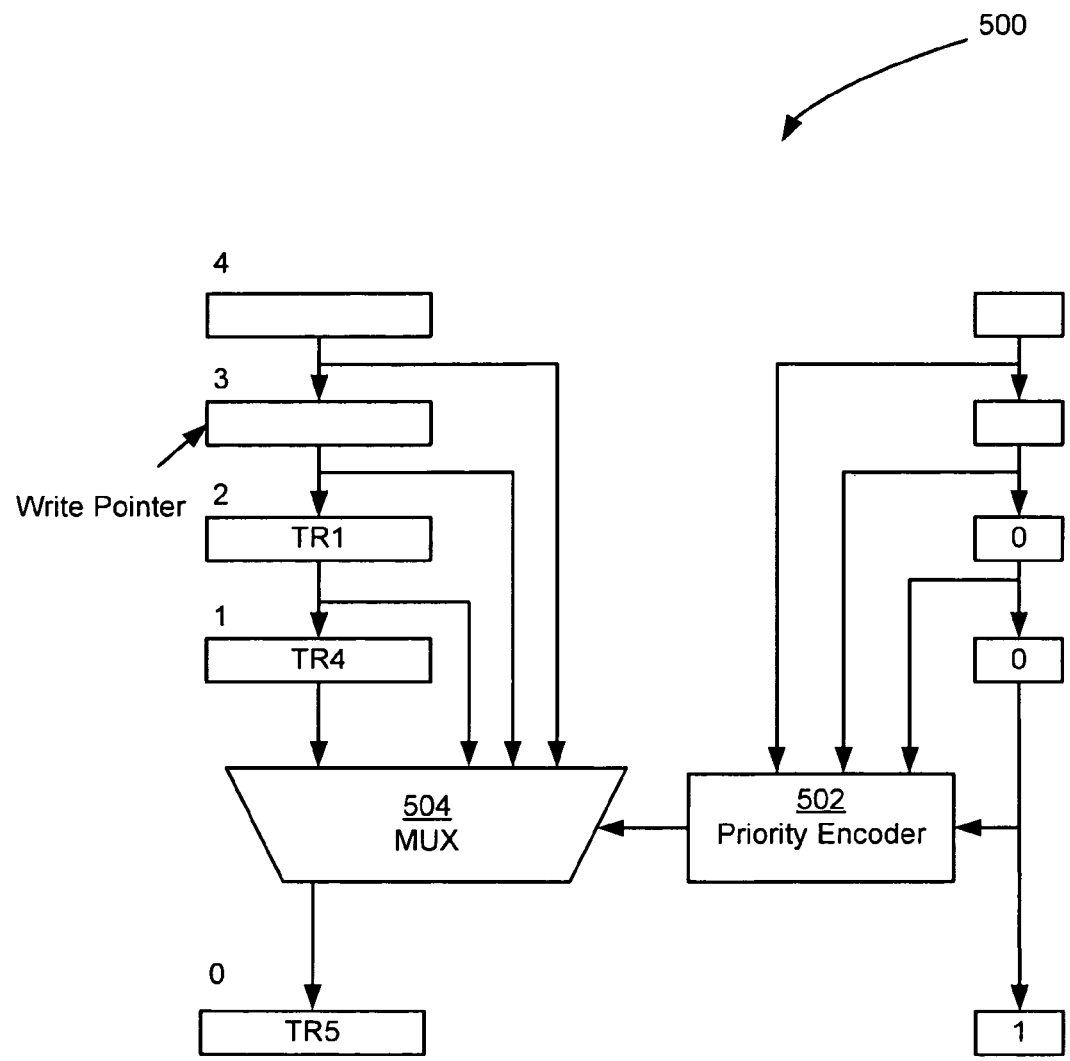
FIG. 10 is a general diagram of the second exemplary buffer management structure in FIG. 9 after determining the next valid transaction request.

Buffer management structures according to some embodiments can include additional components to further decrease latency or otherwise improve processor performance. FIGS. 9-10 illustrate an implementation of a second embodiment of a buffer management structure 500 that can allow a valid transaction request to be read out of a FIFO earlier than invalid transaction requests that may otherwise be ahead of the valid transaction request in the write entries. The buffer management structure includes five write entries in which transaction requests and a bit indicating a validity of each transaction request can be stored. Write entry 0, the fixed read position, includes transaction request TR2 from a second processor thread that is in an invalid state as indicated by a digital "0" associated with TR2. Write entry 1 includes transaction request TR4 from a fourth processor thread that is in an invalid state. Entry 2 includes transaction request TR1 from a first processor thread that is in an invalid state. Entry 3 includes transaction request TR5 from a fifth processor thread that is in a valid state as indicated by a digital "1" associated with TR5.

The buffer management structure 500 includes a priority encoder 502 and a multiplexer 504 that can identify a valid transaction request and move it to write entry 0 ahead of invalid transaction requests. For example, when TR2 is read out from the FIFO, the bit associated with each transaction request is provided to the priority encoder 502. The priority encoder 502 can identify the first valid transaction request in the FIFO by identifying the first valid bit and its position in the write entries. In some embodiments, the priority encoder 502 counts bits that are digital "0" to determine a position in the write entries of the first valid transaction request. The priority encoder 502 identifies the transaction request using a transaction identification associated with the valid bit and provides an identification of the first valid transaction request as a selector to the multiplexer 504. The multiplexer 504 uses the identification of the first valid transaction request to select the transaction request and move it to write entry 0 as shown in FIG. 10. The valid transaction request may be read out during the next clock cycle, after a read request is received from a resource or otherwise ahead of invalid transaction requests.

Example Devices Including the Above Described Features

Buffer management structures may be included in any processors including buffers, such as digital signal processors. The general diagrams of FIGS. 11-15 illustrate example devices that may incorporate buffer management structures for managing transaction requests provided by threads of a multi-threaded processor to device resources.

Figure 11:
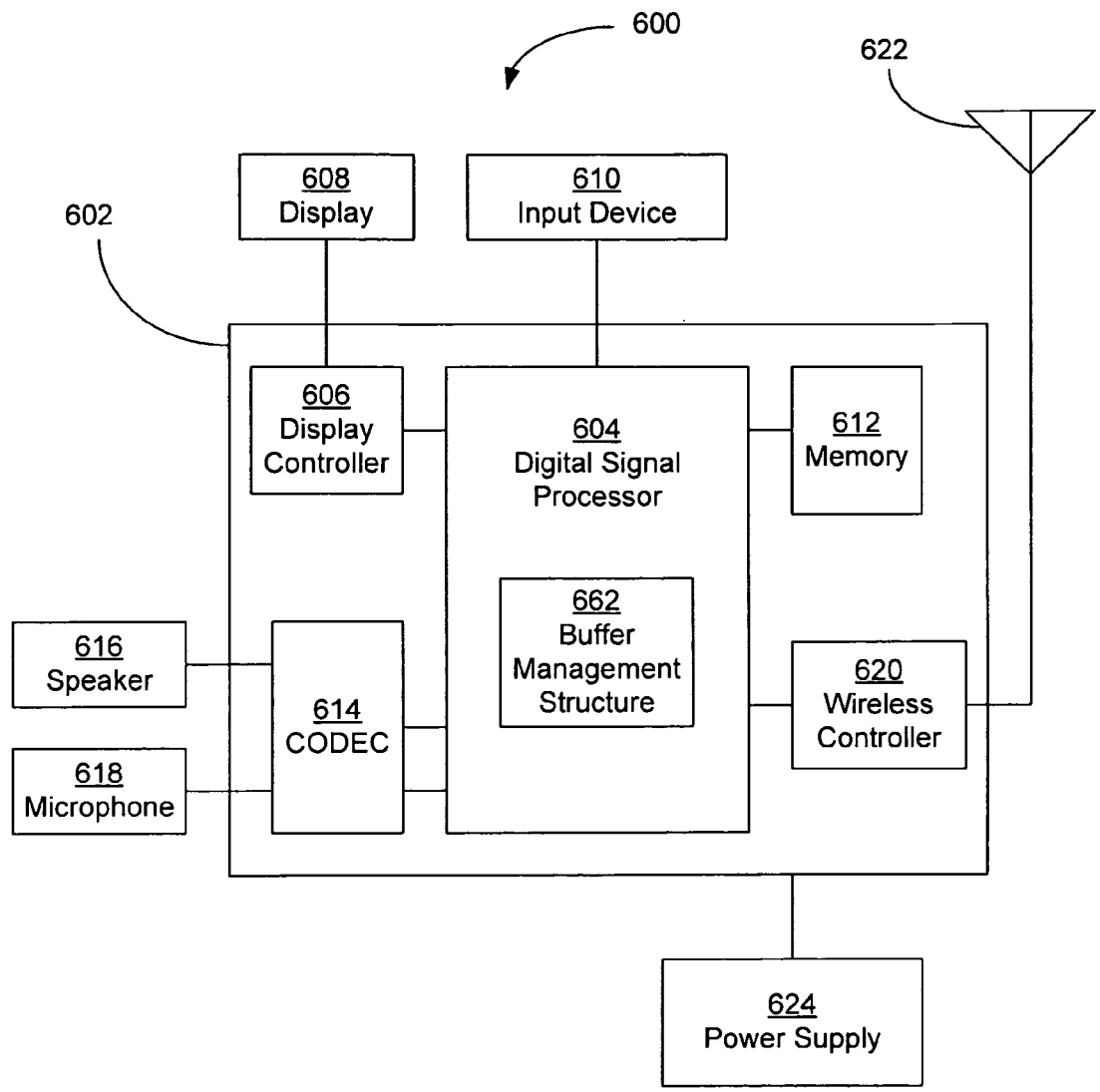
FIG. 11 is a general diagram illustrating an example portable communication device that may include a buffer management structure.

FIG. 11 is a diagram illustrating an exemplary embodiment of a portable communication device 600. As illustrated in the general diagram of FIG. 11, the portable communication device includes an on-chip system 602 that includes a digital signal processor (DSP) 604. The general diagram of FIG. 11 also shows a display controller 606 that is coupled to the digital signal processor (DSP) 604 and a display 608. Moreover, an input device 610 is coupled to the DSP 604. As shown, a memory 612 is coupled to the DSP 604. Additionally, a coder/decoder (CODEC) 614 may be coupled to the DSP 604. A speaker 616 and a microphone 618 may be coupled to the CODEC 614.

The general diagram of FIG. 11 further illustrates a wireless controller 620 coupled to the digital signal processor 604 and a wireless antenna 622. In a particular embodiment, a power supply 624 is coupled to the on-chip system 602. The display 626, the input device 630, the speaker 616, the microphone 618, the wireless antenna 622, and the power supply 624 may be external to the on-chip system 602. However, each can be coupled to a component of the on-chip system 602.

In a particular embodiment, the DSP 604 includes a buffer management structure 662, as described with reference to FIG. 2A or 2B, that can manage transaction requests from threads to device resources and reduce latency and/or reduce power needed for processing of transaction requests. For example, the DSP 604 may be a multi-threaded processor in which each thread can provide transaction requests to device resources. The buffer management structure 662 can manage the order in which the transaction requests are processed and identify transaction requests for which threads subsequently provided an invalidation request to reduce latency. In another embodiment, buffer management structure 662 may include additional components as described with reference to FIGS. 9-10.

Figure 12:
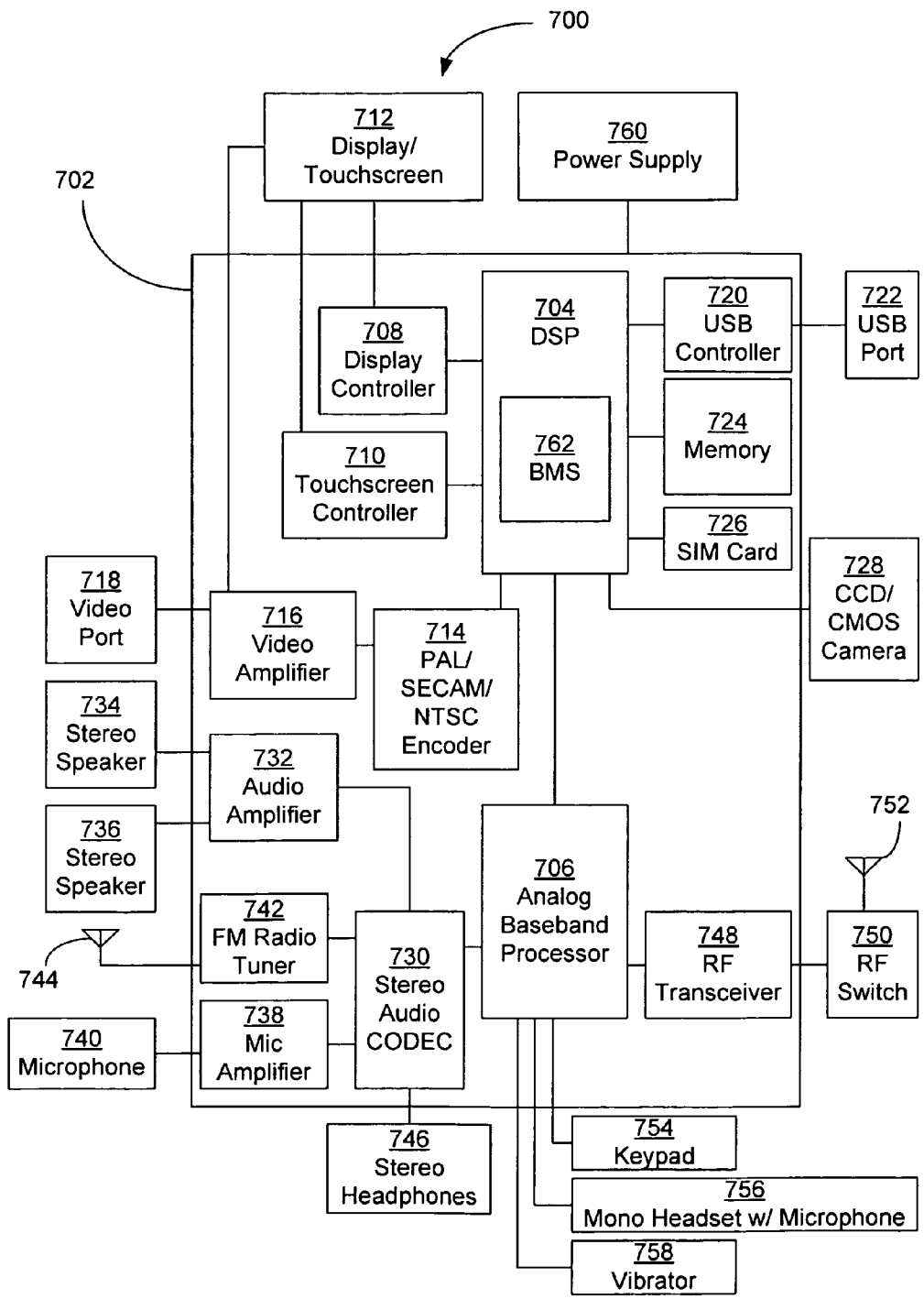
FIG. 12 is a general diagram illustrating an example cellular telephone that may include a buffer management structure.

FIG. 12 is a diagram illustrating an exemplary embodiment of a cellular telephone 700. As shown, the cellular telephone 700 includes an on-chip system 702 that includes a digital baseband processor 704 and an analog baseband processor 706 that are coupled together. In a particular embodiment, the digital baseband processor 704 is a digital signal processor. As illustrated in the general diagram of FIG. 12, a display controller 708 and a touchscreen controller 710 are coupled to the digital baseband processor 704. In turn, a touchscreen display 712 external to the on-chip system 702 is coupled to the display controller 708 and the touchscreen controller 710.

The general diagram of FIG. 12 further illustrates a video encoder 714, e.g., a phase alternating line (PAL) encoder, a sequential couleur a memoire (SECAM) encoder, or a national television system(s) committee (NTSC) encoder, is coupled to the digital baseband processor 704. Further, a video amplifier 716 is coupled to the video encoder 714 and the touchscreen display 712. Also, a video port 718 is coupled to the video amplifier 716. A universal serial bus (USB) controller 720 is coupled to the digital baseband processor 704. Also, a USB port 722 is coupled to the USB controller 720. A memory 724 and a subscriber identity module (SIM) card 726 may also be coupled to the digital baseband processor 704. Further, as shown in the general diagram of FIG. 12, a digital camera 728 may be coupled to the digital baseband processor 704. In an exemplary embodiment, the digital camera 728 is a charge-coupled device (CCD) camera or a complementary metal-oxide semiconductor (CMOS) camera.

As further illustrated in the general diagram of FIG. 12, a stereo audio CODEC 730 may be coupled to the analog baseband processor 706. Moreover, an audio amplifier 732 may be coupled to the stereo audio CODEC 730. In an exemplary embodiment, a first stereo speaker 734 and a second stereo speaker 736 are coupled to the audio amplifier 732. A microphone amplifier 738 may be also coupled to the stereo audio CODEC 730. Additionally, a microphone 740 may be coupled to the microphone amplifier 738. In a particular embodiment, a frequency modulation (FM) radio tuner 742 may be coupled to the stereo audio CODEC 730. An FM antenna 744 can be coupled to the FM radio tuner 742. Further, stereo headphones 746 may be coupled to the stereo audio CODEC 730.

The general diagram of FIG. 12 further illustrates a radio frequency (RF) transceiver 748 that may be coupled to the analog baseband processor 706. An RF switch 750 may be coupled to the RF transceiver 748 and an RF antenna 752. A keypad 754 may be coupled to the analog baseband processor 706. Also, a mono headset with a microphone 756 may be coupled to the analog baseband processor 706. Further, a vibrator device 758 may be coupled to the analog baseband processor 706. The general diagram of FIG. 12 also shows a power supply 760 that may be coupled to the on-chip system 702. In a particular embodiment, the power supply 760 is a direct current (DC) power supply that provides power to the various components of the cellular telephone 700. Further, in a particular embodiment, the power supply is a rechargeable DC battery or a DC power supply that is derived from an alternating current (AC) to DC transformer that is coupled to an AC power source.

As depicted in the general diagram of FIG. 12, the touchscreen display 712, the video port 718, the USB port 722, the camera 728, the first stereo speaker 734, the second stereo speaker 736, the microphone 740, the FM antenna 744, the stereo headphones 746, the RF switch 750, the RF antenna 752, the keypad 754, the mono headset 756, the vibrator 758, and the power supply 760 may be external to the on-chip system 702. In a particular embodiment, the digital baseband processor 704 may include a buffer management structure (BMS) 762, as described with reference to FIG. 2A or 2B, that can manage transaction requests from threads to device resources and reduce latency and/or reduce power needed for processing of transaction requests. For example, the digital baseband processor 704 may be a multi-threaded processor in which each thread can provide transaction requests to device resources. The BMS 762 can manage the order in which the transaction requests are processed and identify transaction requests for which threads subsequently provided an invalidation request to reduce latency. In another embodiment, BMS 762 may include additional components as described with reference to FIGS. 9-10.

Figure 13:
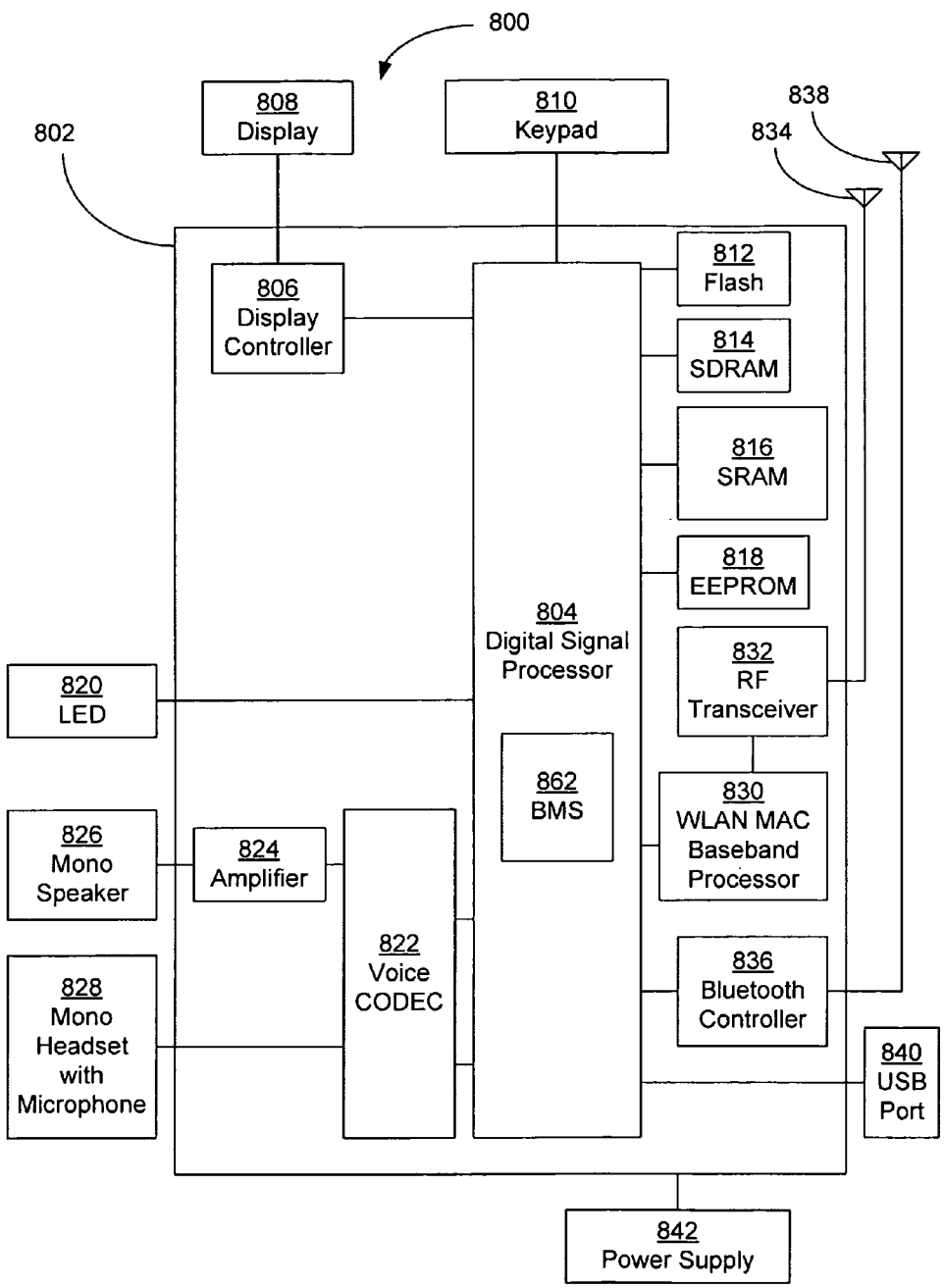
FIG. 13 is a general diagram illustrating an example wireless Internet Protocol telephone that may include a buffer management structure.

FIG. 13 is a diagram illustrating an exemplary embodiment of a wireless Internet protocol (IP) telephone 800. As shown, the wireless IP telephone 800 includes an on-chip system 802 that includes a digital signal processor (DSP) 804. A display controller 806 may be coupled to the DSP 804 and a display 808 is coupled to the display controller 806. In an exemplary embodiment, the display 808 is a liquid crystal display (LCD). FIG. 13 further shows that a keypad 810 may be coupled to the DSP 804.

A flash memory 812 may be coupled to the DSP 804. A synchronous dynamic random access memory (SDRAM) 814, a static random access memory (SRAM) 816, and an electrically erasable programmable read only memory (EEPROM) 818 may also be coupled to the DSP 804. The general diagram of FIG. 13 also shows that a light emitting diode (LED) 820 may be coupled to the DSP 804. Additionally, in a particular embodiment, a voice CODEC 822 may be coupled to the DSP 804. An amplifier 824 may be coupled to the voice CODEC 822 and a mono speaker 826 may be coupled to the amplifier 824. The general diagram of FIG. 13 further illustrates a mono headset 828 coupled to the voice CODEC 822. In a particular embodiment, the mono headset 828 includes a microphone.

A wireless local area network (WLAN) baseband processor 830 may be coupled to the DSP 804. An RF transceiver 832 may be coupled to the WLAN baseband processor 830 and an RF antenna 834 may be coupled to the RF transceiver 832. In a particular embodiment, a Bluetooth controller 836 may also be coupled to the DSP 804 and a Bluetooth antenna 838 may be coupled to the controller 836. The general diagram of FIG. 13 also shows that a USB port 840 may also be coupled to the DSP 804. Moreover, a power supply 842 is coupled to the on-chip system 802 and provides power to the various components of the wireless IP telephone 800.

As indicated in the general diagram of FIG. 13, the display 808, the keypad 810, the LED 820, the mono speaker 826, the mono headset 828, the RF antenna 834, the Bluetooth antenna 838, the USB port 840, and the power supply 842 may be external to the on-chip system 802 and coupled to one or more components of the on-chip system 802. In a particular embodiment, the DSP 804 includes a buffer management structure (BMS) 862, as described with reference to FIG. 2A or 2B, that can manage transaction requests from threads to device resources and reduce latency and/or reduce power needed for processing of transaction requests. For example, the DSP 804 may be a multi-threaded processor in which each thread can provide transaction requests to device resources. The BMS 862 can manage the order in which the transaction requests are processed and identify transaction requests for which threads subsequently provided an invalidation request to reduce latency. In another embodiment, BMS 862 may include additional components as described with reference to FIGS. 9-10.

Figure 14:
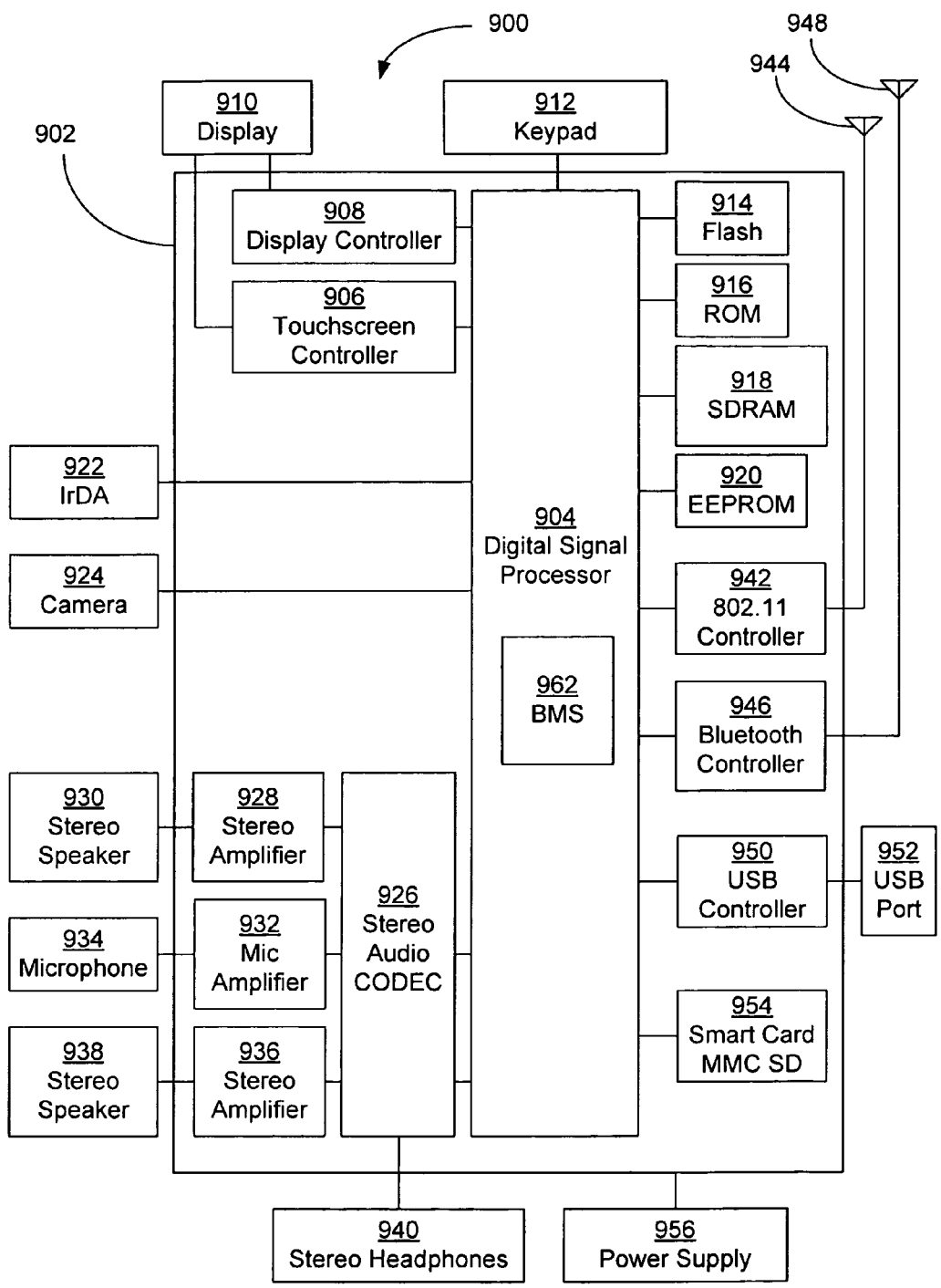
FIG. 14 is a general diagram illustrating an example portable digital assistant that may include a buffer management structure.

FIG. 14 is a diagram illustrating an exemplary embodiment of a portable digital assistant (PDA) 900. As shown, the PDA 900 includes an on-chip system 902 that includes a digital signal processor (DSP) 904. A touchscreen controller 906 and a display controller 908 are coupled to the DSP 904. Further, a touchscreen display 910 is coupled to the touchscreen controller 906 and to the display controller 908. The general diagram of FIG. 14 also indicates that a keypad 912 may be coupled to the DSP 904.

In a particular embodiment, a stereo audio CODEC 926 may be coupled to the DSP 904. A first stereo amplifier 928 may be coupled to the stereo audio CODEC 926 and a first stereo speaker 930 may be coupled to the first stereo amplifier 928. Additionally, a microphone amplifier 932 may be coupled to the stereo audio CODEC 926 and a microphone 934 may be coupled to the microphone amplifier 932. The general diagram of FIG. 14 further shows a second stereo amplifier 936 that may be coupled to the stereo audio CODEC 926 and a second stereo speaker 938 that may be coupled to the second stereo amplifier 936. In a particular embodiment, stereo headphones 940 may also be coupled to the stereo audio CODEC 926.

The general diagram of FIG. 14 also illustrates an 802.11 controller 942 that may be coupled to the DSP 904 and an 802.11 antenna 944 that may be coupled to the 802.11 controller 942. Moreover, a Bluetooth controller 946 may be coupled to the DSP 904 and a Bluetooth antenna 948 may be coupled to the Bluetooth controller 946. A USB controller 950 may be coupled to the DSP 904 and a USB port 952 may be coupled to the USB controller 950. Additionally, a smart card 954, e.g., a multimedia card (MMC) or a secure digital card (SD), may be coupled to the DSP 904. Further, a power supply 956 may be coupled to the on-chip system 902 and may provide power to the various components of the PDA 900.

As indicated in the general diagram of FIG. 14, the display 910, the keypad 912, the IrDA port 922, the digital camera 924, the first stereo speaker 930, the microphone 934, the second stereo speaker 938, the stereo headphones 940, the 802.11 antenna 944, the Bluetooth antenna 948, the USB port 952, and the power supply 956 may be external to the on-chip system 902 and coupled to one or more components on the on-chip system 902. In a particular embodiment, the DSP 904 includes a buffer management structure (BMS) 962, as described with reference to FIG. 2A or 2B, that can manage transaction requests from threads to device resources and reduce latency and/or reduce power needed for processing of transaction requests. For example, the DSP 904 may be a multi-threaded processor in which each thread can provide transaction requests to device resources. The BMS 962 can manage the order in which the transaction requests are processed and identify transaction requests for which threads subsequently provided an invalidation request to reduce latency. In another embodiment, BMS 962 may include additional components as described with reference to FIGS. 9-10.

Figure 15:
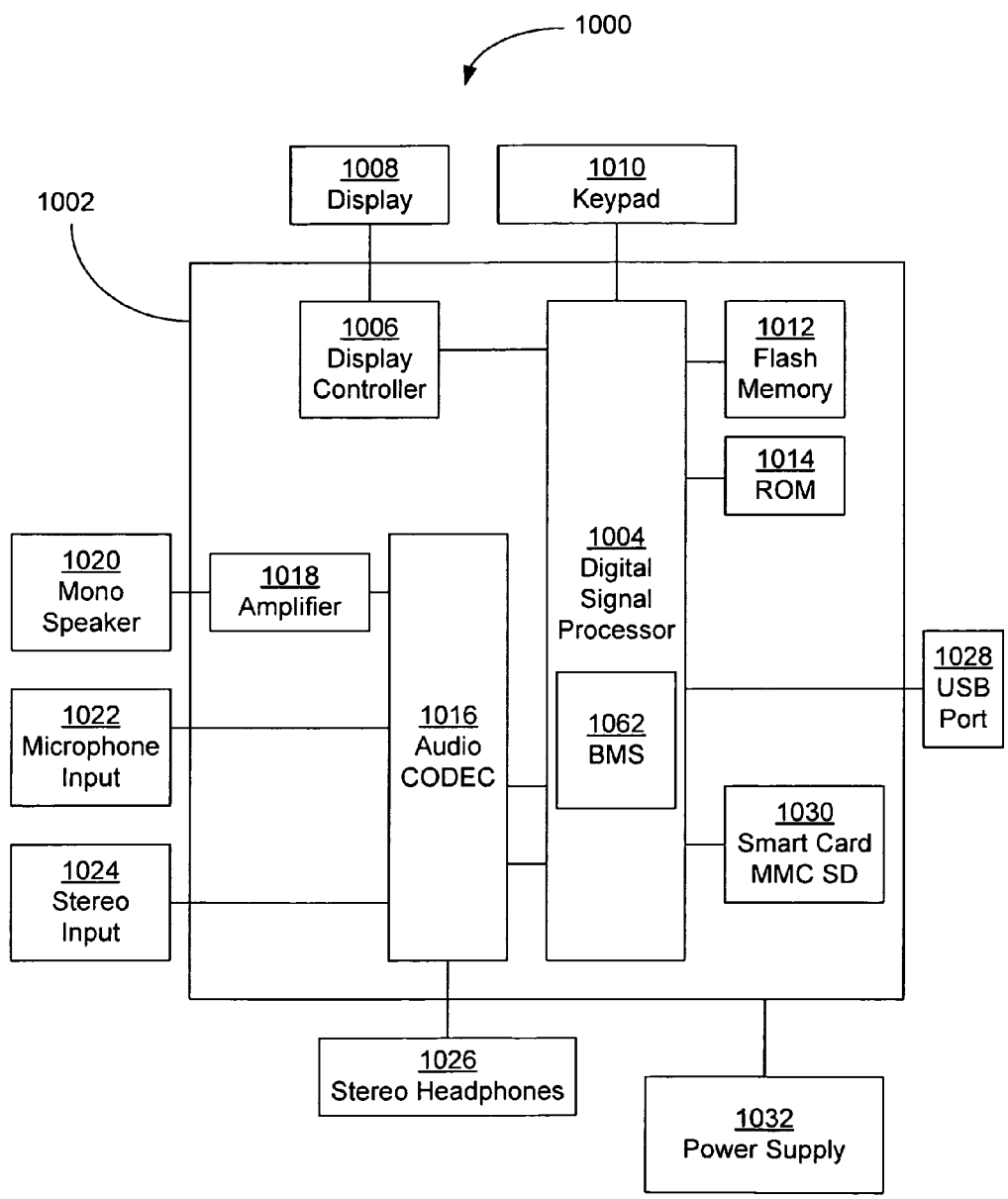
FIG. 15 is a general diagram illustrating an example audio file player that may include a buffer management structure.

FIG. 15 is a diagram illustrating an exemplary embodiment of an audio file player (e.g., MP3 player) 1000. As shown, the audio file player 1000 includes an on-chip system 1002 that includes a digital signal processor (DSP) 1004. A display controller 1006 may be coupled to the DSP 1004 and a display 1008 is coupled to the display controller 1006. In an exemplary embodiment, the display 1008 is a liquid crystal display (LCD). A keypad 1010 may be coupled to the DSP 1004.

As further depicted in the general diagram of FIG. 15, a flash memory 1012 and a read only memory (ROM) 1014 may be coupled to the DSP 1004. Additionally, in a particular embodiment, an audio CODEC 1016 may be coupled to the DSP 1004. An amplifier 1018 may be coupled to the audio CODEC 1016 and a mono speaker 1020 may be coupled to the amplifier 1018. The general diagram of FIG. 15 further indicates that a microphone input 1022 and a stereo input 1024 may also be coupled to the audio CODEC 1016. In a particular embodiment, stereo headphones 1026 may also be coupled to the audio CODEC 1016.

A USB port 1028 and a smart card 1030 may be coupled to the DSP 1004. Additionally, a power supply 1032 may be coupled to the on-chip system 1002 and may provide power to the various components of the audio file player 1000.

As indicated in the general diagram of FIG. 15 the display 1008, the keypad 1010, the mono speaker 1020, the microphone input 1022, the stereo input 1024, the stereo headphones 1026, the USB port 1028, and the power supply 1032 are external to the on-chip system 1002 and coupled to one or more components on the on-chip system 1002. In a particular embodiment, the DSP 1004 includes a buffer management structure (BMS) 1062, as described with reference to FIG. 2A or 2B, that can manage transaction requests from threads to device resources and reduce latency and/or reduce power needed for processing of transaction requests. For example, the DSP 1004 may be a multi-threaded processor in which each thread can provide transaction requests to device resources. The BMS 1062 can manage the order in which the transaction requests are processed and identify transaction requests for which threads subsequently provided an invalidation request to reduce latency. In another embodiment, BMS 1062 may include additional components as described with reference to FIGS. 9-10.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A buffer management structure comprising:
   a storage module, wherein the storage module comprises:
   a first write entry storing a first transaction request and a first bit, the first bit indicating a valid state for the first transaction request;
   a second write entry storing a second transaction request and a second bit, the second bit indicating whether the second transaction request is associated with a valid state, wherein the second write entry is located adjacent to the first write entry; and
   a third write entry storing a third transaction request and a third bit, the third bit indicating whether the third transaction request is associated with a valid state, wherein the third write entry is located adjacent to the second write entry; and
   a priority encoder configured to identify a closest transaction request associated with a valid state to a multiplexer based on the second bit and the third bit;
   wherein, in response to the second bit indicating an invalid state and the third bit indicating a valid state, the multiplexer is configured to move the third transaction request and the third bit to the first write entry after the first transaction request is output, and wherein the multiplexer is further configured to retain the second transaction request and the second bit in the second write entry.

2. The buffer management structure of claim 1, wherein the priority encoder identifies the third transaction request to the multiplexer as the closest transaction request in response to a determination that the third bit is a closest bit to the first write entry that indicates a valid state.

3. The buffer management structure of claim 1, wherein the first write entry corresponds to a location associated with a read pointer.

4. The buffer management structure of claim 1, further comprising control logic, the control logic configured to output the first transaction request and the first bit.

5. The buffer management structure of claim 4, wherein the control logic is configured to output the first transaction request and the first bit to a joint translation lookaside buffer (TLB).

6. The buffer management structure of claim 1, wherein the buffer management structure is integrated in a communication device.

7. The buffer management structure of claim 4, wherein the control logic is configured to output the first transaction request and the first bit to a bus interface.

8. The buffer management structure of claim 7, wherein the bus interface is an AXI bus interface.

9. The buffer management structure of claim 1, wherein the buffer management structure is integrated in a cellular telephone.

10. The buffer management structure of claim 1, wherein the buffer management structure is integrated in a wireless Internet protocol telephone.

11. The buffer management structure of claim 1, wherein the buffer management structure is integrated in a portable digital assistant.

12. The buffer management structure of claim 1, wherein the buffer management structure is integrated in an audio file player.

13. The buffer management structure of claim 3, wherein the read pointer is operable to cause the first transaction request to be output in response to a received command.

14. A processing system comprising:
a joint translation lookaside buffer (TLB), wherein the joint TLB is configured to service an instruction TLB and a data TLB, the data TLB having priority over the instruction TLB;
the instruction TLB, wherein the instruction TLB is configured to provide a plurality of transaction requests to a buffer management structure from threads of a multi-threaded processor; and
the buffer management structure comprising:
a storage module, wherein the storage module comprises:
a first write entry storing a first transaction request and a first bit, the first bit indicating a valid state for the first transaction request;
a second write entry storing a second transaction request and a second bit, the second bit indicating whether the second transaction request is associated with a valid state, wherein the second write entry is located adjacent to the first write entry; and
a third write entry comprising a third transaction request and a third bit, the third bit indicating whether the third transaction request is associated with a valid state, wherein the third write entry is adjacent to the second write entry; and
a priority encoder configured to identify a closest transaction request associated with a valid state to a multiplexer based on the second bit and the third bit;
wherein, in response to the second bit indicating an invalid state and the third bit indicating a valid state, the multiplexer is configured to move the third transaction request and the third bit to the first write entry after the first transaction request is output, and wherein the multiplexer is further configured to retain the second transaction request and the second bit in the second write entry.

15. The processing system of claim 14, further comprising control logic, the control logic configured to:
receive a read request from the joint TLB;
in response to receiving the read request, determine that the first transaction request stored at the first write entry is valid based on the first bit; and
output the first transaction request from the first write entry to the joint TLB in response to determining that the first transaction request stored at the first write entry is valid.

16. The processing system of claim 14, wherein the priority encoder identifies the third transaction request to the multiplexer as the closest transaction request in response to a determination that the third bit is a closest bit to the first write entry that indicates a valid state.

17. A method, comprising:
storing a first transaction request and a first bit in a first write entry, wherein the first bit indicates a valid state for the first transaction request;
storing a second transaction request and a second bit in a second write entry, wherein the second write entry is located adjacent to the first write entry and wherein the second bit indicates whether the second transaction request is associated with a valid state;
storing a third transaction request and a third bit in a third write entry, wherein the third write entry is located adjacent to the second write entry and wherein the third bit indicates whether the third transaction request is associated with a valid state;
identifying a closest transaction request associated with a valid state based on the second bit and the third bit; and
in response to the second bit indicating an invalid state and the third bit indicating a valid state, moving the third transaction request and the third bit to the first write entry after the first transaction request is output and retaining the second transaction request and the second bit in the second write entry.

18. The processing system of claim 15, wherein the control logic is further configured to output the first bit from the first write entry to the joint TLB in response to the read request and in response to the determination that the first transaction request stored at the first write entry is valid.

19. The method of claim 17, wherein the third transaction request and the third bit are moved to the first write entry by a multiplexer.

20. The method of claim 19, wherein the multiplexer is configured to move the third transaction request and the third bit to the first write entry in response to receiving information from a priority encoder, wherein the information identifies that the first bit and the second bit are associated with corresponding invalidity states.

21. A buffer management structure comprising:
an entry configured to store a request for processing information, the entry corresponding to a fixed read position;
a first write entry storing a first transaction request and a first bit, the first bit indicating whether the first transaction request is associated with a valid state, wherein the first write entry is located adjacent to the entry;
a second write entry storing a second transaction request and a second bit, the second bit indicating whether the second transaction request is associated with a valid state, wherein the second write entry is located adjacent to the first write entry; and
digital logic configured to move the second transaction request to the entry corresponding to the fixed read position in response to a determination that the second write entry is a closest entry to the entry corresponding to the fixed read position that has a bit indicating a valid state.

22. The buffer management structure of claim 21, wherein the determination that the second bit is the closest bit to the fixed read position that indicates a valid state is performed by a priority encoder.

23. The buffer management structure of claim 21, wherein the digital logic includes a multiplexer.

24. The buffer management structure of claim 21, wherein the digital logic is further configured to retain the first transaction request and the first bit in the first write entry after the digital logic moves the second transaction request to the entry.

25. The buffer management structure of claim 21, wherein the digital logic is further configured to discard the first transaction request and the first bit from the first write entry.

26. The buffer management structure of claim 21, wherein the entry corresponding to the fixed read position is further configured to store a bit indicating a valid state for the request for processing information.

27. A buffer management structure comprising:
means for storing:
a first transaction request and a first bit at a first write entry, the first bit indicating a valid state for the first transaction request;
a second transaction request and a second bit at a second write entry, the second bit indicating whether the second transaction request is associated with a valid state, wherein the second write entry is located adjacent to the first write entry; and a third transaction request and a third bit at a third write entry, the third bit indicating whether the third transaction request is associated with a valid state, wherein the third write entry is located adjacent to the second write entry;

means for identifying a closest transaction request associated with a valid state based on the second bit and the third bit; and means for moving the third transaction request and the third bit to the first write entry after the first transaction request is output, and for retaining the second transaction request and the second bit in the second write entry.

28. A non-transitory computer-readable medium storing processor executable instructions that, when executed by a processor, cause the processor to:

store a first transaction request and a first bit at a first write entry, the first bit indicating a valid state for the first transaction request;

store a second transaction request and a second bit at a second write entry, the second bit indicating whether the second transaction request is associated with a valid state, wherein the second write entry is located adjacent to the first write entry;

store a third transaction request and a third bit at a third write entry, the third bit indicating whether the third transaction request is associated with a valid state, wherein the third write entry is located adjacent to the second write entry;

identify a closest transaction request associated with a valid state based on the second bit and the third bit; and move the third transaction request and the third bit to the first write entry after the first transaction request is output and retain the second transaction request and the second bit in the second write entry.

29. A buffer management structure comprising:

entry means for storing a request for processing information, the entry means corresponding to a fixed read position;

first write entry means for storing a first transaction request and a first bit, the first bit indicating whether the first transaction request is associated with a valid state, wherein the first write entry means is located adjacent to the entry means;

second write entry means for storing a second transaction request and a second bit, the second bit indicating whether the second transaction request is associated with a valid state, wherein the second write entry means is located adjacent to the first write entry means; and means for moving the second transaction request to the entry means corresponding to the fixed read position in response to a determination that the second write entry means is a closest entry to the entry means corresponding to the fixed read position that has a bit indicating a valid state.

30. A non-transitory computer-readable medium storing processor executable instructions that, when executed by a processor, cause the processor to:

store a request for processing information at an entry, the entry corresponding to a fixed read position;

store a first transaction request and a first bit at a first write entry, the first bit indicating whether the first transaction request is associated with a valid state, wherein the first write entry is located adjacent to the entry;

store a second transaction request and a second bit at second write entry, the second bit indicating whether the second transaction request is associated with a valid state, wherein the second write entry is located adjacent to the first write entry; and move the second transaction request to the entry corresponding to the fixed read position in response to a determination that the second write entry is a closest entry to the entry corresponding to the fixed read position that has a bit indicating a valid state.

31. A method comprising:

storing a request for processing information at an entry, the entry corresponding to a fixed read position;

storing a first transaction request and a first bit at a first write entry, the first bit indicating whether the first transaction request is associated with a valid state, wherein the first write entry is located adjacent to the entry;

storing a second transaction request and a second bit at second write entry, the second bit indicating whether the second transaction request is associated with a valid state, wherein the second write entry is located adjacent to the first write entry; and moving the second transaction request to the entry corresponding to the fixed read position in response to a determination that the second write entry is a closest entry to the entry corresponding to the fixed read position that has a bit indicating a valid state.

* * * * *